No. 865,821. PATENTED SEPT. 10, 1907.
W. J. RICHARDS.
SYSTEM OF MOTOR CONTROL.
APPLICATION FILED MAR. 1, 1907.
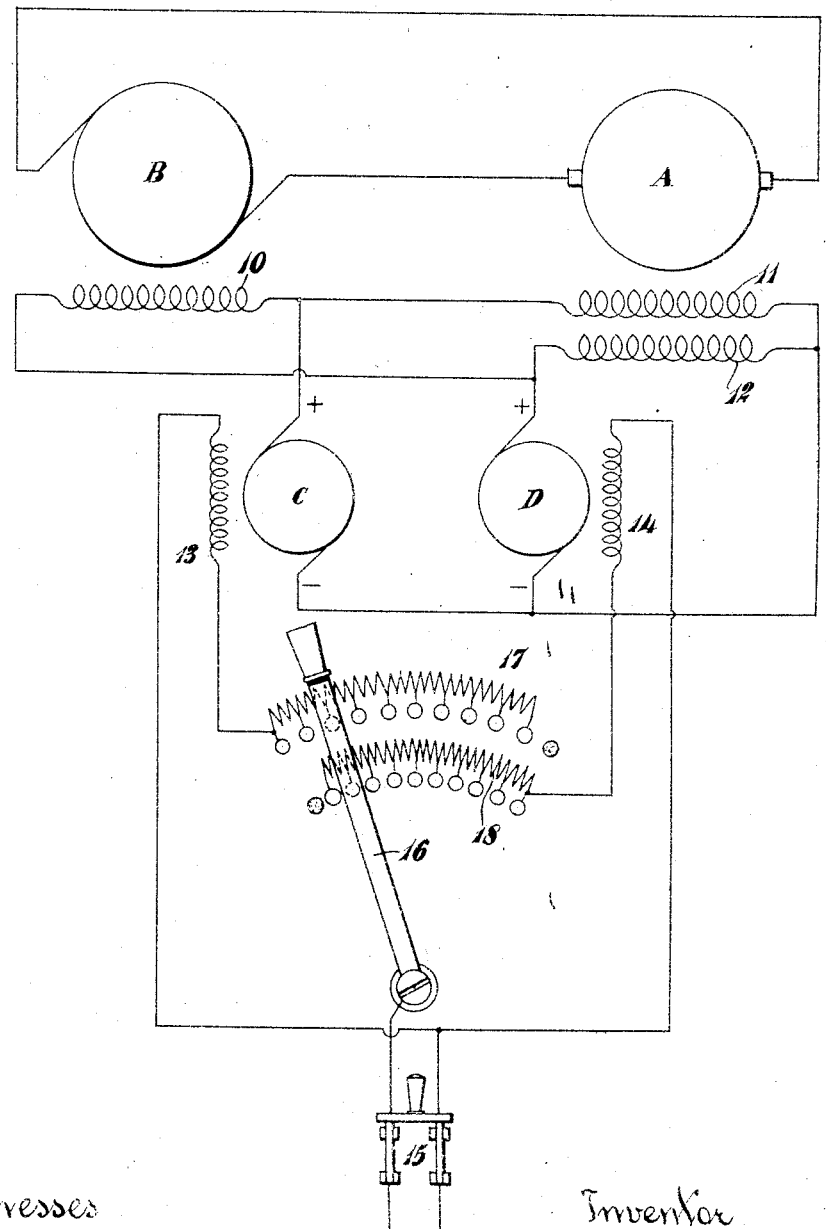
Witnesses
Inventor
Walter J. Richards
By
Chas. E. Lord
Attorney

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY.

SYSTEM OF MOTOR CONTROL.

No. 865,821. Specification of Letters Patent. Patented Sept. 10, 1907.

Application filed March 1, 1907. Serial No. 359,973.

*To all whom it may concern:*

Be it known that I, WALTER J. RICHARDS, a citizen of the United States, residing at Norwood, in the county of Hamilton and State of Ohio, have invented certain new and useful Improvements in Systems of Motor Control, of which the following is a full, clear, and exact specification.

My invention relates to motor control systems.

It has been found that one of the most efficient methods of controlling the speed of an electric motor is by varying the electromotive force of the generator supplying its armature. Various systems have been devised in which this might be done.

My invention is an improvement on such systems and its object is to provide a system in which all the advantages of said prior systems are retained while in addition there are certain other advantages, such as variation in the field strength of the motor to be controlled, and a greater simplicity in arrangement and operation.
With these objects in view, my invention comprises the combination in a motor control system, of a main motor to be controlled, a generator supplying the armature of said motor, a plurality of sources of current supply arranged to supply the field magnet of the generator differentially and the field winding of the motor cumulatively, and means for varying the electromotive forces of said sources.

My invention further comprises the method of controlling an electric motor which consists in supplying its armature from a dynamo-electric source, exciting its field by the cumulative action of two sources of current supply, exciting the field of the dynamo-electric source by the differential action of the same two sources of current and varying the relation of the electromotive forces of said two sources.

More specifically my invention comprises the combination of a motor, a generator supplying the armature of said motor, two auxiliary generators connected in opposition through a field winding of the generator, two assisting field windings for the motor each supplied by one of said two auxiliary generators, and means for varying the field strengths of said auxiliary generators inversely.

Other features of my invention will appear from the description and drawings and will be particularly pointed out in the claims.

The single figure of the drawing shows diagrammatically one embodiment of my invention.

The armature A of the main motor is supplied directly by the armature B of the generator, driven in any desired manner. The field winding 10 of the generator is supplied by the armatures C and D of two auxiliary generators or exciters, connected in opposition and preferably driven together. The two assist-
ing field windings 11 and 12 of the motor are supplied independently by the exciters C and D respectively. The exciter field windings 13 and 14 are supplied from any suitable source of current through a switch 15. A rheostat arm 16 is movable to vary inversely the amount of the resistances 17 and 18 in circuit with these two field windings respectively.

The operation of the system is as follows:—The generators B, C and D are started with the switch 15 closed and the arm 16 preferably in its vertical or neutral position to keep the field strengths of the two exciters substantially equal. As these generators come to speed the electromotive forces of the exciters C and D remain practically equal, and as these two electromotive forces are opposed through the winding 10 of the main generator C, said latter generator generates substantially no electromotive force. The field windings 11 and 12 of the motor A however, being individually excited by the two generators C and D respectively, are effective, so that when the generators C and D reach full speed, the field of the motor A is at its strongest. So far, however, the motor armature A has remained at a standstill.

By moving the arm 16 to either side of the vertical, say to the left as shown, the resistance 17 is cut out of circuit and the resistance 18 cut into circuit with the field windings 13 and 14 respectively, thereby increasing the field strength and consequently the electromotive force of the generator C while decreasing the field strength and consequently the electromotive force of D. The difference between these two electromotive forces being impressed on the field winding 10, the electromotive force of the armature B is gradually increased from zero to the maximum as the arm 16 moves from its vertical to its extreme left position. When this latter position is reached the circuit of the field winding 14 is broken and the maximum electromotive force of the generator C is impressed on the field winding 10. As the arm 16 is moved from the vertical to the left the effect of the motor field winding 12 is decreased while that of the motor field winding 11 is increased. However, on account of the knees in the saturation curves of the field magnets of the exciters C and D, the field winding 12 decreases in strength faster than the field winding 11 increases so that their combined effect is decreased. Both because of the increase in the electromotive force impressed on its armature and the decrease in its field strength the speed of the motor A is increased as the arm 16 is moved away from the vertical. As the arm 16 is moved back toward the vertical the reverse of the operations described above takes place and the motor A gradually decreases in speed. When the arm is moved on the right of the vertical a cycle of operations similar to that when it is moved on the left of the vertical takes place, save that the direction of current in the field winding 10 and therefore in the armatures B and A is reversed and the motor A rotates in the other direction.

Many modifications in the precise arrangements here shown and described may be made without departing from the spirit and scope of my invention, and in the following claims I aim to cover all such modifications.

What I claim as new is:—

1. The method of operating an electric motor, which consists in supplying its armature from a dynamo-electric source, exciting its field by the cumulative action of two sources of current supply, and exciting the field of the dynamo-electric source by the differential action of the same two sources of current supply.

2. The method of controlling an electric motor, which consists in supplying its armature from a dynamo-electric source, exciting its field by the cumulative action of two additional sources of current supply, exciting the field of said dynamo-electric source by the differential action of the same two sources of current supply, and varying the relation between the electromotive forces of said two additional sources of current supply.

3. The method of controlling an electric motor, which consists in supplying its armature from a dynamo-electric source, exciting its field by the cumulative action of two sources of current supply, exciting the field of the dynamo-electric source by the differential action of the same two sources of current supply, and varying the electromotive force of one of said sources of current supply.

4. The method of controlling an electric motor, which consists in supplying its armature from a dynamo-electric source, exciting its field by the cumulative action of two sources of current supply, exciting the field of the dynamo-electric source by the differential action of the same two sources of current supply, and varying the electromotive forces of said two sources of current supply inversely.

5. The method of controlling an electric motor, which consists in supplying its armature from a dynamo-electric source, exciting its field by the cumulative action of two additional sources of current supply, exciting the field of said dynamo-electric source by the differential action of the same two sources of current supply, and varying the electromotive forces of said two additional sources of current supply.

6. A system of electrical distribution, comprising a motor, a generator supplying the armature of said motor, and two sources of current supply arranged to excite the field of the motor by their cumulative action and the field of the generator by their differential action.

7. A system of motor control, comprising a motor, a plurality of sources of electromotive force, one of which is a dynamo and supplies the armature of said motor, the field of said motor being excited by the cumulative action of two of said sources, and the field of said dynamo by the differential action of the same two sources, and means for varying the relation between the electromotive forces of said two sources.

8. A system of motor control, comprising a motor, a generator supplying the armature of said motor, two sources of current supply arranged to excite the field of the motor by their cumulative action and the field of the generator by their differential action, and means for varying the electromotive force of one of said sources of current supply.

9. A system of motor control, comprising a motor, a plurality of sources of electromotive force, one of which is a dynamo and supplies the armature of said motor, the field of said motor being excited by the cumulative action of two of said sources and the field of said dynamo by the differential action of the same two sources, and means for simultaneously varying the electromotive forces of said two sources.

10. A system of motor control, comprising a motor, a generator supplying the armature of said motor, two sources of current supply arranged to excite the field of the motor by their cumulative action and the field of the generator by their differential action, and means for simultaneously varying the electromotive forces of said two sources of current supply inversely.

11. A system of electrical distribution, comprising a motor, a generator supplying the armature of said motor, a field winding for the generator supplied by the differential action of two sources of current supply, and two field windings for the motor independently supplied by said two sources of current supply respectively.

12. A system of motor control, comprising a motor, a generator supplying the armature of said motor, two sources of current supply, a field winding for the generator supplied by said two sources of current supply in opposing series, two field windings for the motor supplied independently by said two sources of current supply respectively, and means for varying the relation between the electromotive forces of said two sources of current supply.

13. A system of motor control, comprising a motor, a generator supplying the armature of said motor, a field winding for the generator supplied by the differential action of two sources of current supply, two field windings for the motor independently supplied by said two sources of current supply respectively, and means for varying the electromotive force of one of said sources of current supply.

14. A system of motor control, comprising a motor, a generator supplying the armature of said motor, a field winding for the generator supplied by the differential action of two sources of current supply, two field windings for the motor independently supplied by said two sources of current supply respectively, and means for simultaneously varying the electromotive forces of said two sources of current supply inversely.

15. A system of motor control, comprising a motor, a generator supplying the armature of said motor, two sources of current supply, a field winding for the generator supplied by said two sources of current supply in opposing series, two field windings for the motor supplied independently by said two sources of current supply respectively, and means for simultaneously varying the electromotive forces of said two sources of current supply.

16. A system of electrical distribution, comprising a motor, and a generator supplying the armature of said motor, the field of said generator being supplied by the differential action of two dynamo-electric generators and the field of the motor by the cumulative action of the same two generators.

17. In a system of motor control, a motor, a main generator supplying the armature of said motor, two additional dynamo electric generators, the field of said main generator being excited by the differential action of said two additional generators and the field of the motor by the cumulative action of said two additional generators, and means for varying the relative field strengths of said two additional dynamo-electric generators.

18. A system of motor control, comprising a motor, a plurality of dynamo-electric generators, one of which supplies the armature of said motor, the field of said armature-supplying generator being supplied by the differential action of two of said generators and the field of the motor by the cumulative action of two of said generators, and means for varying the field strength of one of said generators.

19. A system of motor control, comprising a motor, a plurality of dynamo-electric generators, one of which supplies the armature of said motor, the field of said armature-supplying generator being supplied by the differential action of two of said generators and the field of the motor by the cumulative action of the same two generators, and means for varying the field strengths of said two generators inversely.

20. In a system of motor control, a motor, a main generator supplying the armature of said motor, two additional dynamo-electric generators, the field of said main generator being excited by the differential action of said two additional generators and the field of the motor by the cumulative action of said two additional generators, and means for varying the field strengths of said additional dynamo-electric generators.

21. A system of electrical distribution, comprising a motor, a main generator supplying the armature of said motor, two additional dynamo-electric generators, a field winding for the main generator supplied by said two additional dynamo-electric generators in opposing series, and two assisting field windings for the motor supplied independently by said two additional dynamo-electric generators respectively.

22. A system of motor control, comprising a motor, a plurality of dynamo-electric generators, one of which supplies the armature of said motor, a field winding for said armature-supplying generator supplied by the differential action of two of said generators, two assisting field windings for the motor supplied independently by the same two generators respectively, and means for varying the relative field strengths of said two generators.

23. A system of motor control, comprising a motor, a main generator supplying the armature of said motor, two additional dynamo-electric generators, a field winding for the main generator supplied by said two additional dynamo-electric generators in opposing series, two assisting field windings for the motor supplied independently by said two additional dynamo-electric generators respectively, and means for varying the field strength of one of said additional dynamo-electric generators.

24. A system of motor control, comprising a motor, a plurality of dynamo-electric generators, one of which supplies the armature of said motor, a field winding for said armature-supplying generator supplied by the differential action of two of said generators, two assisting field windings for the motor supplied independently by the same two generators respectively, and means for varying the field strength of said two generators.

25. A system of motor control, comprising a motor, a main generator supplying the armature of said motor, two additional dynamo-electric generators, a field winding for the main generator supplied by said two additional dynamo-electric generators in opposing series, two assisting field windings for the motor supplied independently by said two additional dynamo-electric generators respectively, and means for varying the field strengths of said additional dynamo-electric generators inversely.

26. A system of electrical distribution, comprising two dynamo-electric machines, two auxiliary sources of current supply, a field winding for one of said dynamo-electric machines which is supplied by said two additional sources of current supply in series, and two field windings for the other dynamo-electric machine which are independently supplied by said two additional sources of current supply respectively.

27. A system of electrical distribution, comprising two dynamo-electric machines, two auxiliary sources of current supply, a field winding for one of said dynamo-electric machines which is supplied by said two additional sources of current supply in series, two field windings for the other dynamo-electric machine which are independently supplied by said two additional sources of current supply respectively, and means for varying the electromotive forces of said two additional sources of current supply.

28. A system of electrical distribution, comprising two dynamo-electric machines, two auxiliary sources of current, a field winding for one of said dynamo-electric machines which is supplied by said two additional sources of current supply in series, two field windings for the other dynamo-electric machine which are independently supplied by said two additional sources of current supply respectively, and means for varying the electromotive forces of said two additional sources of current supply inversely.

29. In a system of electrical distribution, two main dynamo-electric machines, two auxiliary dynamo-electric generators, a field winding for one of said main dynamo-electric machines which is supplied by said two auxiliary generators in series, and two field windings for the other main dynamo-electric machine which are independently supplied by said two auxiliary generators respectively.

30. In a system of electrical distribution, two main dynamo-electric machines, two auxiliary dynamo-electric generators, a field winding for one of said main dynamo-electric machines which is supplied by said two auxiliary generators in series, two field windings for the other main dynamo-electric machine which are independently supplied by said two auxiliary generators respectively, and means for varying the field strengths of said two auxiliary generators.

31. In a system of electrical distribution, two main dynamo-electric machines, two auxiliary dynamo-electric generators, a field winding for one of said main dynamo-electric machines which is supplied by said two auxiliary generators in series, two field windings for the other main dynamo-electric machine which are independently supplied by said two auxiliary generators respectively, and means for varying the field strengths of said two auxiliary generators inversely.

32. In a system of electrical distribution, two dynamo-electric machines, two exciters, a field winding for one of said dynamo-electric machines supplied by said exciters in series, two field windings for the other dynamo-electric machine supplied independently by said two exciters respectively, resistances in the field circuits of the exciters, and means for varying said resistances.

33. In a system of electrical distribution, two dynamo-electric machines, two exciters, a field winding for one of said dynamo-electric machines supplied by said exciters in series, two field windings for the other dynamo-electric machine supplied independently by said two exciters respectively, resistances in the field circuits of the exciters, and means for varying said resistances inversely.

34. In a system of electrical distribution, two dynamo-electric machines, two exciters, a field winding for one of said dynamo-electric machines which is supplied by said two exciters in series, two field windings for the other dynamo-electric machine which are supplied independently by said two exciters respectively, and a unitary means for varying the resistance of the exciter field circuits.

35. In a system of electrical distribution, two dynamo-electric machines, two exciters, a field winding for one of said dynamo-electric machines which is supplied by said two exciters in series, two field windings for the other dynamo-electric machine which are supplied independently by said two exciters respectively, and a unitary means for varying inversely the resistance of the exciter field circuits.

In testimony whereof I affix my signature, in the presence of two witnesses.

WALTER J. RICHARDS.

Witnesses:
GEO. B. SCHLEY,
FRED J. KINSEY.